United States Patent [19]

Velisavljevic

[11] Patent Number: 5,660,248

[45] Date of Patent: Aug. 26, 1997

[54] APPARATUS FOR TRANSPORTING DRUMS

[76] Inventor: Milisav Velisavljevic, P.O. Box 984, Waukegan, Ill. 60079

[21] Appl. No.: 516,833

[22] Filed: Aug. 18, 1995

[51] Int. Cl.$^6$ ................................................. B66F 9/12
[52] U.S. Cl. ................................................ 187/237; 414/621
[58] Field of Search .................................. 187/231, 237, 187/244; 414/910, 621, 622, 618

[56] References Cited

U.S. PATENT DOCUMENTS

| | | | |
|---|---|---|---|
| 2,827,189 | 3/1958 | Knudstrup | 414/621 |
| 3,410,431 | 11/1968 | Vik | 414/621 |

FOREIGN PATENT DOCUMENTS

| | | | |
|---|---|---|---|
| 2032385 | 5/1980 | United Kingdom | 414/621 |

*Primary Examiner*—Kenneth Noland
*Attorney, Agent, or Firm*—Wood, Phillips, VanSanten, Clark & Mortimer

[57] ABSTRACT

Difficulties in handling drums when transporting them from one location to another may be avoided through use of an apparatus for transporting the drums that includes a cart frame (12) having spaced side members (13) and (14) extending to an open side. The spacing between the side members (13), (14) is such as to allow a drum (84) to be transported to fit between the side members (13), (14) by advancing the open side toward the drum (84). Wheels (18), (22) are located on the cart frame (10) and a lifting frame (12) is mounted on the cart frame (10) for elevating movement thereon. The lifting frame is open on one side to receive a drum to be transported and includes a lifting side (80) adapted to engage a rib (82) on a drum (84). Grapple arms (68) are located on the lifting frame (12) for engaging a drum (84) and holding the drum (84) against the lifting side (80). Lift assemblies (40) are provided for lifting the lifting frame (12) away from the cart frame (10).

11 Claims, 2 Drawing Sheets

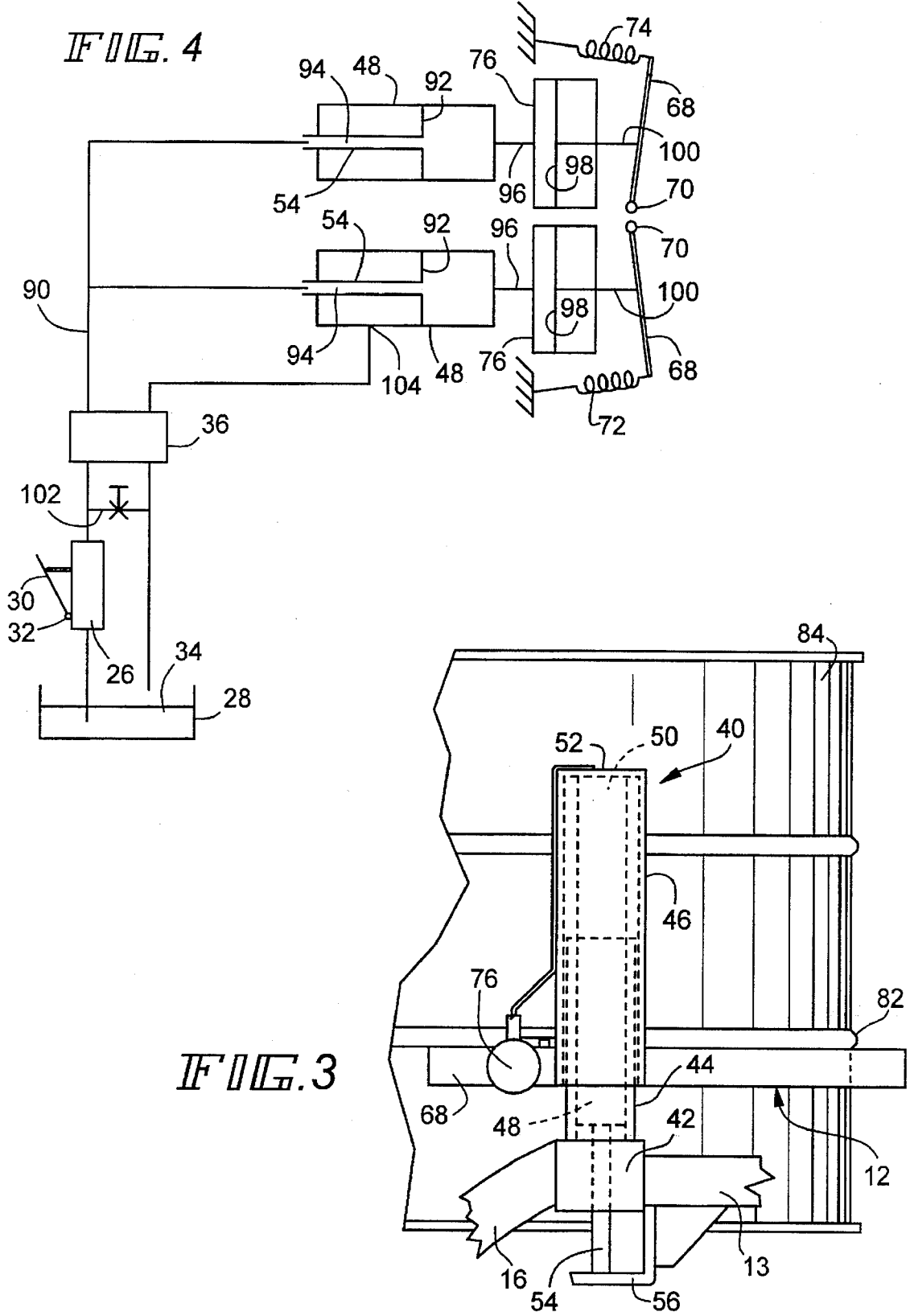

APPARATUS FOR TRANSPORTING DRUMS

FIELD OF THE INVENTION

This invention relates to transport apparatus, and more particularly, to a manually operable apparatus for transporting drums from one location to another.

Large, liquid filled drums of sizes up to 55 gallons are commonly found in industrial settings. They are employed to contain all manner of liquid, semi-liquid, solid and granular materials employed in a large variety of manufacturing processes. Chemical compounds, in liquid or in solid form, are frequently stored in such drums while awaiting use in a manufacturing process. Solvents are similarly stored.

Such drums are extremely heavy and difficult to transport. For example, a 55 gallon drum filled with gasoline will weight in excess of 330 lbs., the 330 lbs. being the weight of the contents only. Moreover, when such drums are only partially filled with a liquid or a granular material, in the course of being transported, the liquid or granular material may shift readily within the drum and the resulting sloshing effect introduces an element of instability in the transporting process.

When it has been necessary to manually transport such drums, a variety of means have been employed. In many instances, conventional two wheel trucks have been utilized. For stability, the drum may be strapped to the truck. The truck is then tipped backwards on its two wheels and pushed or towed to the point whereat the drum is to be deposited.

To minimize the effort required in this mode of transporting a drum, it is necessary to maintain the center of gravity of the drum directly over the rotational axis of the wheels of the truck, something that is not easy to do when the drum is liquid filled and the liquid is sloshing around inside the same.

In some cases, wheeled carts with a rounded underside have been used to transport and/or support drums and ease the shifting of the drum to a horizontal position whereat it may be employed to readily dispense a liquid contained therein. These type of carts are difficult to manipulate in a transport mode because the wheels are typically quite small and are located at one end of the cart and thus difficult to maintain under the center of gravity of the drum.

It would be highly desirable if means were available whereby drums could be transported from one location to another manually with the same ease as loaded pallets. The present invention is directed to meeting that need.

SUMMARY OF THE INVENTION

It is the principal object of the invention to provide a new and improved means for transporting drums. More specifically, it is an object of the invention to provide a new and improved means for transporting drums that are provided with peripheral ribs on the side thereof.

An exemplary embodiment of the invention includes a cart frame having spaced side members extending to an open side. The spacing between the side members is such as to allow a drum to be transported to fit between the side members by advancing the open side of the cart frame toward the drum to be transported. Wheels are disposed on the cart frame so that the frame can be pushed or towed from one location to another. A lifting frame is mounted for elevating movement on the cart frame and the lifting frame is open on one side to receive a drum to be transported. The lifting frame also includes a lifting side which is adapted to engage a rib on the drum to be transported.

Grapple means are located on the lifting frame for engaging a drum to be transported at the lifting frame open side and for holding the drum against the lifting side. Means are provided for elevating the lifting frame away from the cart frame to lift the drum by the rib thereon when held against the lifting side by the grapple means.

In a preferred embodiment of the invention, the grapple means includes at least one arm movably mounted on the lifting frame adjacent the open side thereof. Arm moving motor means are provided for moving the arm toward the lifting frame open side and means are included for biasing the arm away from the lifting frame open side to facilitate the disposition of a drum in a position to be lifted.

In a highly preferred embodiment, the elevating means comprises a lifting frame moving means and the invention further includes means for sequencing the motor means so that the arm moving motor means is the first to be actuated and the last to be deactivated and the lifting frame motor means is the last to be activated and the first to be deactivated. In this way, it is assured that the drum is firmly grasped by the grapple arms and held to the lifting side of the lifting frame before the lifting frame is elevated by its motor means.

In a preferred embodiment, each of the motor means comprises at least one hydraulic cylinder and the sequencing means is defined by pressure responsive surfaces in the cylinders. The area of the pressure responsive surface of the arm moving motor means is greater than the area of the pressure responsive surface of the lifting frame elevating motor means. A pump is provided for simultaneously providing hydraulic fluid under pressure to all of the hydraulic cylinders. Because of the difference in pressure responsive areas, the aforementioned sequencing is achieved.

In a preferred embodiment, two of the wheels are mounted on the cart frame on respective side members near the open side thereof and at least one additional wheel is mounted on a towing fork pivoted to the cart frame for rotation about a generally vertical axis and located oppositely of the cart frame open end.

In a highly preferred embodiment, the tow fork includes a manually operable hydraulic pump and a towing handle is pivoted to the tow fork and connected to the pump for activating the same and providing hydraulic fluid under pressure. The hydraulic fluid under pressure is utilized to activate the grapple means and the elevating means.

In one embodiment of the invention, the elevating means comprises a hydraulic cylinder including a cylinder housing and a piston movable within the housing. Means are provided for connecting the pump to the interior of the housing on one side of the piston. A drain port is located in the cylinder housing interior and is normally isolated from the pump by the piston. The port is uncovered by the piston and in fluid communication with the pump for a predetermined extension of the cylinder to thereby limit the elevation of the lifting frame relative to the cart frame. In a preferred embodiment, the piston rod of the hydraulic cylinder employed as the elevating means includes a port that extends through its interior to the interior of the housing cylinder on one side of the piston therein. A fluid connection is located from the cylinder housing one side to the grapple means hydraulic cylinder.

Other objects and advantages will become apparent from the following specification taken in connection with the accompanying drawings.

DESCRIPTION OF THE DRAWINGS

FIG. 3 is a fragmentary side elevation of the apparatus; and

FIG. 4 is a schematic of a hydraulic circuit employed in the invention.

DESCRIPTION OF THE PREFERRED EMBODIMENT

Figure 1:
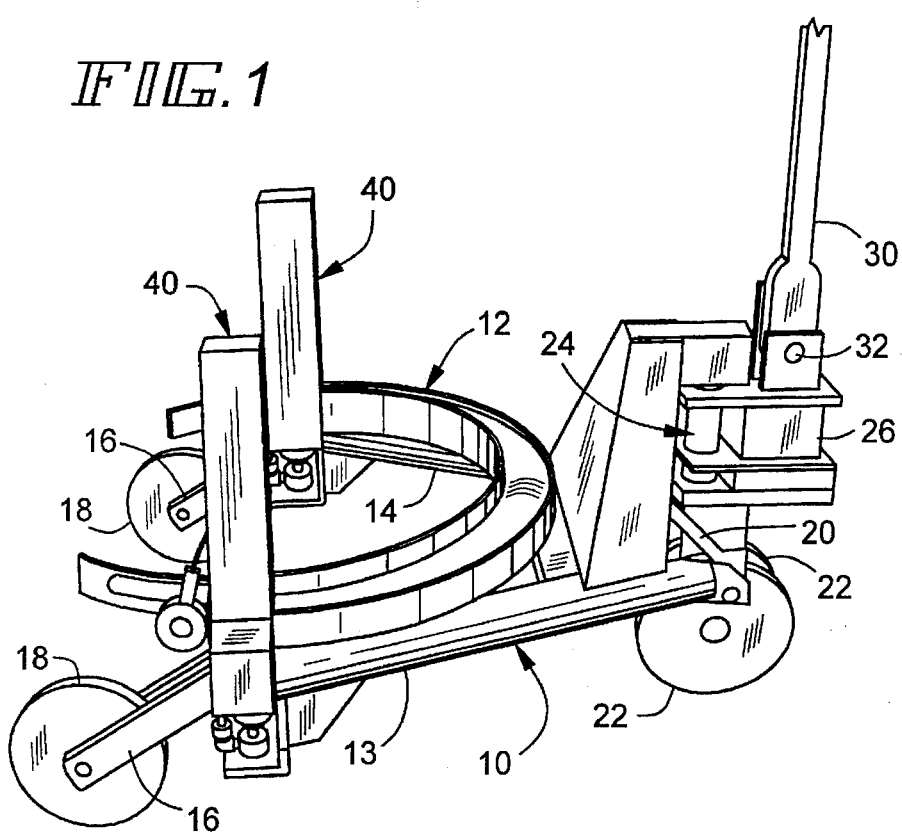
FIG. 1 is a perspective view of an apparatus for transporting drums made according to the invention.

An exemplary embodiment of an apparatus for transporting ribbed drums made according to the invention is illustrated in FIG. 1. The same is seen to include a cart frame, generally designated 10, onto which a lifting frame, generally designated 12 is movably mounted for elevation thereon. The cart frame 10 includes spaced side members 13 and 14. At one end of each of the arms, 13 and 14, a fork 16 is mounted and it in turn mounts a respective wheel 18 for the cart frame 12. The wheels 18 are adjacent an open end of the cart frame 12 defined by the spaced members 13 and 14. The spacing is such that the cart frame 12 may be wheeled on the wheels 18 to a drum to be transported and generally flank such a drum.

The end of the cart frame remote from the wheels 18 mounts a tow fork 20 having a pair of steerable wheels 22. The tow fork 20 is mounted for rotation relative to the cart frame 12 about a generally vertical axis to defined by a sleeve and pivot pin combination, generally designated 24. The arrangement may be identical to that conventionally employed in manual pallet transporting trucks as is well known.

The tow fork 20 also mounts a manually operated hydraulic pump 26 and associated reservoir 28 (see also FIG. 4). A handle or tow bar 30 is mounted to the tow fork 20 for rotation about a generally horizontal axis defined by a pivot pin 32 and is connected to the pump 26 so that when moved in a pumping motion, it will draw hydraulic fluid 34 from the reservoir 28 (FIG. 4) and direct the same to a rotary fluid coupling 36 which is coaxial with the sleeve and pivot pin 24 and interconnects the tow fork 20 and the cart frame 12.

As seen in FIG. 1, each of the side members 13 and 14, near the open end of the cart frame 10, mounts a respective lift assembly, generally designated 40. Except in a couple of respects that will be mentioned hereinafter, the lift assemblies 40 are identical, one to the other, and thus only one will be described.

Referring to FIG. 3, a rectangular sleeve 42 is welded or otherwise secured to the associated end of each of the frame members 13 and 14. A rectangular tubular element 44 extends upwardly from the sleeve 42 and a larger tubular element 46 is located on the tubular element 44 in telescoping relation with respect thereto.

Within the tubular elements 44, 46 is a hydraulic cylinder 48. The hydraulic cylinder 48 includes a cylinder housing 50 which is secured to an end plate 52 closing the upper end of the tube 46. The rod 54 of the cylinder 46 is secured an angle 56 suitably secured to the side member 13.

The hydraulic cylinder 48 may be single acting and as a result of this construction, when hydraulic fluid is applied thereto, it will cause the cylinder to extend. The rod 54 will remain stationary relative to the cart frame 30 while the tube 46 will be elevated on the tube 44.

The lifting frame 12 is secured to each of the tubes 46 and as a consequence, the same will be elevated as the cylinder 48 is extended.

Figure 2:
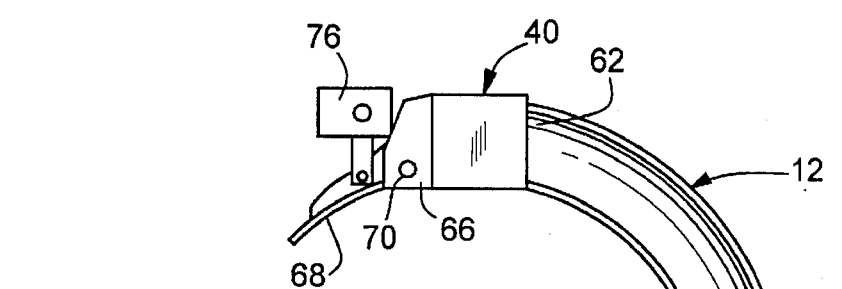
FIG. 2 is a plan view of a lifting frame utilized in the invention.
Figure 2:
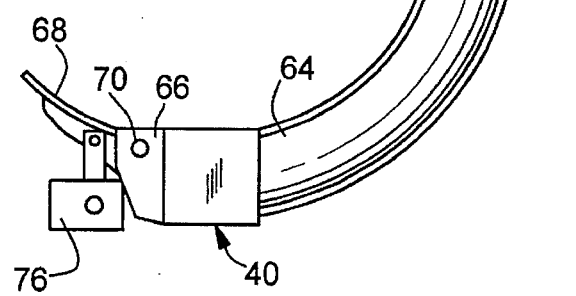

FIG. 2 illustrates the lift frame 12 in greater detail. The same includes a section of I-beam 60 that is curved about a radius on the same order as the radius of a drum to be transported. The angular length of the I-beam 60 is somewhat less than 180° and respective ends 62 and 64 of the I-beam are secured to respective ones of the lifting assemblies 40 so that they are angularly spaced 180°.

Each lifting assembly, in approximately the plane of the I-beam 60, includes a clevis 66 mounted to the side thereof remote from the I-beam 60. Grapple or clamp arms 68 are pivoted as by a pin 70 to each of the clevises 66. The pin 70 defines a vertical pivot axis for the respective arm 68 so it will be appreciated that the same can be moved toward a position tending to partially close the open end of the lifting frame defined by the I-beam 60. Coil springs (not shown in FIG. 2 but illustrated schematically at 72 in FIG. 4) may be disposed about each pivot 70 to bias the associated arm 68 to a position opening the open end of the lifting frame 12.

Also mounted to the clevises 60 are hydraulic cylinders 76 which in turn are connected to respective ones of the arms 66. The hydraulic cylinders 76 are single acting and when supplied with hydraulic fluid under pressure, extend to move the arms 68 toward the position illustrated in FIG. 2. When they are not pressurized, the springs 72 and 74 bias the arms 66 to a position whereat the lifting frame 12 may be caused to freely extend about a drum.

The radially inner edge of the I-beam 60 is shown at 80 and acts as a lifting side of the lifting frame 12. As can be seen in FIG. 3, the same is adapted to be brought into engagement with a rib 82 as conventionally found on the side of a drum 84 so that the latter overlies the lifting side 80. The cylinders 76 may then be actuated to cause the grapple arms 68 to move inwardly against the drum oppositely of the lifting frame to snugly grasp the drum 84 and clamp the same to the lifting frame 12 with the rib 82 positioned above the lifting side 80. Note that in this respect, the upper surfaces of the grapple arms 68 are essentially co-planar with the upper surface of the lifting side 80 so that they too are located below the rib 80. The drum embracing surfaces of the grapple arms 68 may take on any desired shape but generally will be configured to be complementary to the shape of the side of the drum at the location whereat they are to engage the same.

Once the drum is firmly grasped, then the lift assemblies 40 may be actuated to elevate the drum above the underlying terrain. Thereafter, the cart with the drum thereon may be towed by use of the tow bar or handle 30 to a point of use. Once the point of use is reached, the lift assemblies 40 are deactuated to lower the drum 84 until it contacts the underlying terrain. At this point, pressure to the cylinders 76 is released so as to release the grip of the grapple arms 68. At this point, the cart may then be pulled away from the drum through use of the handle or tow bar 30.

It is desirable to maintain the foregoing sequencing of operation in the gripping and lifting, lowering and releasing the drum. Quite clearly, it would be undesirable to lift the drum before the same was firmly grasped or to release the drum before it was fully lowered.

To achieve this end, and to achieve appropriate operation so as to minimize the need for human intervention, a hydraulic circuit such as shown in FIG. 4 is employed.

It will be recalled that the pump 26 is actuated by jacking the tow bar or handle 30 to provide hydraulic fluid to a rotary coupling 36. Hydraulic fluid under pressure exits the coupling 36 on a line 90 from which it is conveyed to the hydraulic cylinders 48. Each of the hydraulic cylinders 48 includes an internal piston 92 connected to the respective rod 54. Each of the rods 54 includes an internal conduit 94 as can be seen schematically in FIG. 4 which opens on the side of the piston 92 remote from the rod end of the associated cylinder 48. Thus, when fluid under pressure is provided, extension of the cylinders 48 will take place as mentioned previously without the rods 54 moving relative to the cart frame 13.

Conduits 96 connect the fluid receiving sides of respective ones of the cylinders 48 to respective ones of the cylinders 76. The cylinders 76 include pistons 98 connected to rods 100 which in turn are connected to the associated grapple arm 68. It will be observed from FIG. 4 that the pressure responsive surface of each of the pistons 98 is significantly larger than the pressure responsive surfaces of each of the cylinders 48. As a consequence, when the system is pressurized by operation of the pump 26, for any given system pressure, a far greater force will be acting on the grapple arms 68 than against the pistons 92 in the cylinders 48 due to the larger effective area of the pistons 98. As a consequence of the greater force acting on the pistons 98, the grapple arms 68 will be moved into firm engagement with the drum 84 before any appreciable movement of the pistons 92 occurs within the cylinders 48.

Once the grapple arms 98 have bottomed out against the drum 84, then the pressure will begin to act against the pistons 92 causing the drum 84 to be elevated by an extension of the lift assemblies 40.

As a consequence, lifting cannot occur until the grapple arms 68 are fully engaged with the drum 84.

When lowering the drum, release of hydraulic pressure, as by operation of a manually operable valve 102 interconnecting the output of the pump 26 and the sump 34, will result in the lift frame 12 lowering under the weight of the drum 84. Alternatively, the cylinder 48 may be provided with internal return springs (not shown) to accelerate the lowering process. The force produced by the weight of the drum 84 acting against fluid within the cylinder housings of the cylinders 48 and acting against the pistons 92 will generate sufficient force to maintain the grapple arms 68 engaged until the drum 84 contacts the underlying terrain, at which time the pressure will drop off to zero and the grapple arms 68 will be disengaged from the drum 84 by action of the springs 72 and 74.

Another feature of the invention is the provision of a port 104 on one of the cylinders 48 on the side of the piston 92 opposite from the connection 96 to the cylinder 76. Normally, the piston 92 will isolate the port 104 from the pump 26. However, as the cylinder 48 is extended, eventually, the piston 92 will uncover the port 104 and the same will now be in fluid communication with the pump 26.

The port 104 is connected via the coupling 36 to the sump 34 so that when it is uncovered, fluid under pressure will be shunted to the sump 34 and will not be available to cause any further lifting of the drum 84. Thus, the placement of the port 104 and its connection to the sump 34 act as a means to limit the elevation of the lifting frame 12.

Alternatively, if desired, pressure limiting circuitry of known design could be employed with a pressure relief valve associated with the pump 26 to disable the same when the maximum extension of the cylinder 48 is obtained.

From the foregoing, it will be appreciated that apparatus for transporting ribbed drums made according to the invention is simple and extremely effective. The same is easily towed and manipulated from one location to another through use of the tow bar or handle 30. The lifting of drums and the coupling of the same to the cart is accomplished simply through pumping action of the tow bar or handle 30 and does not require any additional human intervention.

I claim:

1. Apparatus for transporting ribbed drums or the like comprising:

a cart frame having spaced side members extending to an open side, the spacing between the side members being such as to allow a drum to be transported to fit between said side members by advancing said open side toward the drum to be transported;

wheels on said cart frame;

a lifting frame mounted for elevating movement on said cart frame, said lifting frame being open on one side to receive a drum to be transported and having a lifting side adapted to engage a rib on the drum to be transported;

grapple means on said lifting frame for engaging a drum to be transported at said lifting frame open side and holding the drum against said lifting side, said grapple means comprising at least one arm movably mounted on said lifting frame adjacent said open side thereof, arm moving motor means for moving said arm toward said lifting frame open side, and means for biasing said arm away from said lifting frame open side;

means for elevating said lifting frame away from said cart frame to lift a drum by the rib thereon when held against said lifting side by said grapple means, said elevating means comprising lifting frame moving means; and means for sequencing said motor means so that said arm moving motor means is the first to be activated and the last to be deactivated and said lifting frame motor means is the last to be activated and the first to be deactivated.

2. The apparatus of claim 1 wherein each of said motor means comprises at least one hydraulic cylinder and said sequencing means is defined by pressure responsive surfaces in said cylinders, the area of the pressure responsive surface of said arm moving motor means being greater than the area of the pressure responsive surface of said lifting frame motor means, and a pump for simultaneously providing hydraulic fluid under pressure to all said hydraulic cylinders.

3. Apparatus for transporting rib drums or the like comprising:

a cart frame having spaced side members extending to an open side, the spacing between the side members being such as to allow a drum to be transported to fit between said side members by advancing said open side toward the drum to be transported;

wheels on said cart frame including two wheels mounted on said cart frame on respective side members near the open side thereof and at least one additional wheel mounted on a towing fork pivoted to said cart frame for rotation about a generally vertical axis located oppositely of said cart frame open end, said tow fork including a manually operable hydraulic pump and a towing handle pivoted to said tow fork and connected to said pump for activating the same and providing hydraulic fluid under pressure;

a lifting frame mounted for elevating movement on said cart frame, said lifting frame being open on one side to receive a drum to be transported and having a lifting side adapted to engage a rib on the drum to be transported;

grapple means on said lifting frame for engaging a drum to be transported at said lift frame open side and holding the drum against said lifting side; and means for elevating said lifting frame away, from said cart frame to lift the drum by the rib thereon when held against said lifting side by said grapple means;

said grapple means and said elevating means being hydraulically activated and connected to said pump to be driven thereby.

4. The apparatus of claim 3 wherein said elevating means comprises a hydraulic cylinder including a cylinder housing and a piston movable within said housing; means connecting said pump to the interior of said housing on one side of said piston; and a drain port in said housing interior and normally isolated from said pump by said piston, said port being uncovered by said piston and in fluid communication with said pump for a predetermined extension of said cylinder to thereby limit the elevation of said lifting frame relative to said cart frame.

5. Apparatus for transporting ribbed drums or the like comprising:

a cart frame having spaced side members extending to an open side, the spacing between the side members being such as to allow a drum to be transported to fit between said side members by advancing said open side toward the drum to be transported;

wheels on said cart frame;

a lifting frame mounted for elevating movement on said cart frame, said lifting frame being open on one side to receive a drum to be transported and having a lifting side adapted to engage a rib on the drum to be transported;

grapple means on said lifting frame for engaging a drum to be transported at said lifting frame open side and holding the drum against said lifting side; and means for elevating said lifting frame away from said cartframe to lift a drum by the rib therein when held against said lifting side by said grapple means;

said grapple means and said elevating means each comprising at least one hydraulic cylinder interconnecting said frames, said elevating means hydraulic cylinder including a piston rod connected to said cart frame and a cylinder housing connected to said lifting frame, a port extending through said piston rod to the interior of said cylinder housing on one side of a piston therein; and a fluid connection from said cylinder housing one side to said grapple means hydraulic cylinder.

6. The apparatus of claim 5 wherein the pressure responsive surface of said piston on said cylinder housing one side is smaller than the pressure responsive surface of said grapple means hydraulic cylinder.

7. Apparatus for transporting drums or the like comprising:

a cart frame having spaced side members extending to an open side, the spacing between the side members being such as to allow a drum to be transported to fit between said side members by advancing said open side toward the drum to be transported;

wheels on said cart frame;

a lifting frame mounted for elevating movement on said cart frame;

clamp means, including a first motor means, on said lifting frame for engaging a drum to be transported at said cart frame open side and holding the drum on said lifting frame;

means, including a second motor means, for elevating said lifting frame away from said cart frame to lift a drum held against said lifting side by said clamp means; and means for sequencing said motor means so that said first motor means is the first to be activated and the last to be deactivated and said second motor means is the last to be activated and the first to be deactivated.

8. The apparatus of claim 7 wherein each of said motor means comprises at least one hydraulic cylinder and said sequencing means is defined by pressure responsive surfaces in said cylinders, the area of the pressure responsive surface of said first motor means being greater than the area of the pressure responsive surface of said second motor means, and a pump for simultaneously providing hydraulic fluid under pressure to all said hydraulic cylinders.

9. Apparatus for transporting drums or the like comprising:

a cart frame having spaced side members extending to an open side, the spacing between the side members being such as to allow a drum to be transported to fit between said side members by advancing said open side toward the drum to be transported;

wheels on said cart frame;

a drum lifting frame mounted on said cart frame;

clamp means, including a first motor means, on said drum lifting frame for engaging a drum to be transported and holding the drum on said drum lifting frame;

means, including a second motor means, for elevating at least one of said frames to lift a drum held against said lifting frame by said clamp means; and means, for sequencing said motor means so that said first motor means is the first to be activated and the last to be deactivated and said second motor means is the last to be activated and the first to be deactivated.

10. The apparatus of claim 9 wherein said lifting frame is mounted on said cart frame for elevating movement and said second motor means elevates said lifting frame on said cart frame.

11. The apparatus of claim 9 wherein each of said motor means comprises at least one hydraulic cylinder and said sequencing means is defined by pressure responsive surfaces in said cylinders, the area of the pressure responsive surface of said first motor means being greater than the area of the pressure responsive surface of said second motor means, and a pump for simultaneously providing hydraulic fluid under pressure to all said hydraulic cylinders.

* * * * *